May 31, 1949.  A. D. ROSE ET AL  2,471,704
INDICATING GAUGE
Filed Oct. 1, 1945
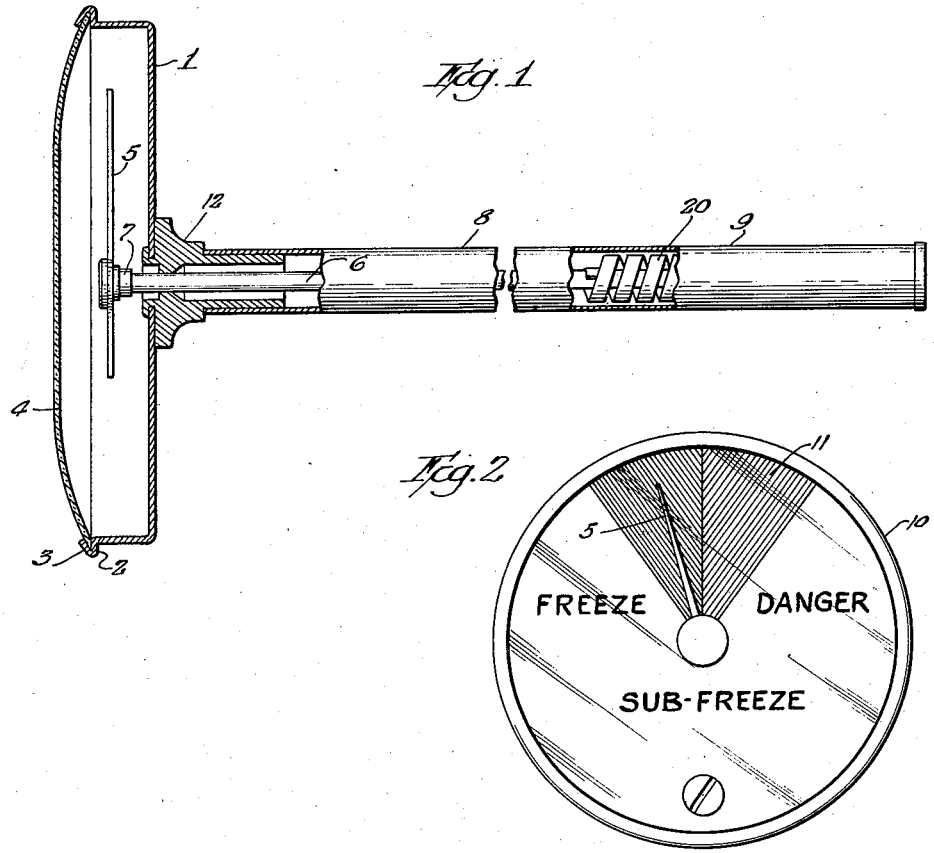
INVENTORS.
Alexander D. Rose
and Bernhard Willach
By Thiess, Olsen & Mecklenburger
Attys.

Patented May 31, 1949

2,471,704

UNITED STATES PATENT OFFICE 2,471,704

INDICATING GAUGE

Alexander D. Rose, Park Ridge, and Bernhard Willach, Chicago, Ill., assignors to Jas. P. Marsh Corporation, Chicago, Ill., a corporation of Illinois Application October 1, 1945, Serial No. 619,474

1 Claim. (Cl. 73—367)

Our invention relates to improvements in indicating gauges.

The object of our invention is to produce an indicating gauge wherein the dial, bezel and crystal mounting are all parts of one integral unit.

Further objects will become apparent upon the examination of the specification and claim.

Referring now to the drawings,

Figure 1 is an axial sectional view of a temperature indicating unit which might, for example, be used for food freezing equipment, and Fig. 2 is a face view of this unit.

Referring to the temperature indicating unit shown in Figs. 1 and 2, the cupped housing 1 has integrally formed therewith the annular peripheral shoulder 2. This shoulder has a flanged peripheral edge as shown at 3 which serves as means for holding in place a transparent cover 4. The indicating pointer 5 is mounted on a rotatable shaft 6 as shown at 7. The rotatable shaft 6 is enclosed in an elongated tube 8 which contains the usual kind of heat-sensitive elements that are commonly used in mechanical temperature measuring devices. This elongated tube 8 is secured to the integral cupped housing 1 by means of the bushing 12.

The particular type of heat measuring device which one may use does not form a part of this invention. The broken-off portion in Fig. 1, shown at 9, indicates the part of the elongated tube in which there is contained whatever heat measuring element one may desire to use. One example is a bimetallic helical heat-sensitive element which is usually placed at the end of the elongated tube 9, as shown at 20, and is mounted in such a form as to actuate the rotatable shaft 6 during temperature changes.

In food freezing equipment it is important to have some means of indicating when the temperature in the freezer reaches a point wherein the quality of the food would be endangered due to excessive temperature. The temperature indicator dial shown at 10 is designed to give the proper warning when the temperature in the freezer reaches a point such as to endanger food quality. The indicating pointer 5 will rotate clockwise with temperature increases, and when this pointer reaches the danger zone the shaded area 11 will indicate this danger stage.

The indicia "Sub freeze," "Freeze," and "Danger" are placed directly on the front face of the bottom of the cupped housing, so that this integral cupped housing functions as a housing for the pointer 5, a bezel for the cover 4, and a dial for the pointer 5.

Our invention is applicable to instruments for indicating pressure, temperature, humidity, speed, and barometer effects. The temperature gauges do not necessarily have to have the heat-sensitive bimetallic element contained in an elongated tube, such as that described in Fig. 1. One may, if desired, place the heat-sensitive element within the cupped housing. In such instances one would eliminate the shaft and have the indicating pointer extend through an opening in the cupped housing. The temperature instruments may also be made with either Bourdon tubes, bellows, or diaphragms replacing the bimetallic elements. The important feature is to have the dial, bezel and crystal mounting all parts of one integral unit.

While we have illustrated and described our invention in all its pertinent details, it will, of course, be understood that we reserve the right to make any changes within the scope of the appended claim without departing from the spirit of our invention.

We claim:

In an indicating gauge, a dial, bezel, indicator, and transparent cover construction comprising an integral cupped housing of material of uniform thickness having dial indicia on the inside of its rear wall, a pointer co-operating with said dial, said rear wall having an opening therethrough, a bushing secured to said rear wall having an opening in alignment with the opening in the wall, a shaft extending through said bushing in which said pointer is mounted, said cupped housing having an annular peripheral shoulder integral therewith, extending outwardly from the radial outermost portion of the cupped portion, and a transparent cover seated on said peripheral shoulder, said shoulder having its peripheral edge flanged over the edge of said transparent cover to hold it in place on said shoulder.

ALEXANDER D. ROSE.
BERNHARD WILLACH.

REFERENCES CITED

The following references are of record in the file of this patent:

UNITED STATES PATENTS

| Number | Name | Date |
|---|---|---|
| 1,485,013 | Blakeslee | Feb. 26, 1924 |
| 1,692,551 | Harris | Nov. 20, 1928 |
| 1,858,262 | Carlson | May 17, 1932 |
| 1,902,998 | Hans | Mar. 28, 1933 |
| 2,158,751 | Ford | May 16, 1939 |